Feb. 13, 1968  T. F. KUZYN  3,368,603

VALVE STEM FOR TUBELESS TIRES AND THE LIKE

Filed March 30, 1966

INVENTOR
THEODORE F. KUZYN
BY
Byerly Townsend Watson & Churchill
ATTORNEYS.

United States Patent Office 3,368,603
Patented Feb. 13, 1968

3,368,603
VALVE STEM FOR TUBELESS TIRES AND THE LIKE
Theodore F. Kuzyn, New Hyde Park, N.Y., assignor to Scovill Manufacturing Company, Waterbury, Conn., a corporation of Connecticut
Filed Mar. 30, 1966, Ser. No. 538,806
9 Claims. (Cl. 152—427)

ABSTRACT OF THE DISCLOSURE

A valve comprising a rigid tubular insert having a covering of rubber-like material held on said insert in unbonded relation thereto, the insert having thereon external projecting means engaging within the covering to prevent relative rotation between the insert and the covering while permitting the covering material to flow under stress between said projecting means, the projecting means being such as to permit mounting the valve in the opening of a support and prevent pull out of the insert from said opening and from said covering.

---

Figure 1:
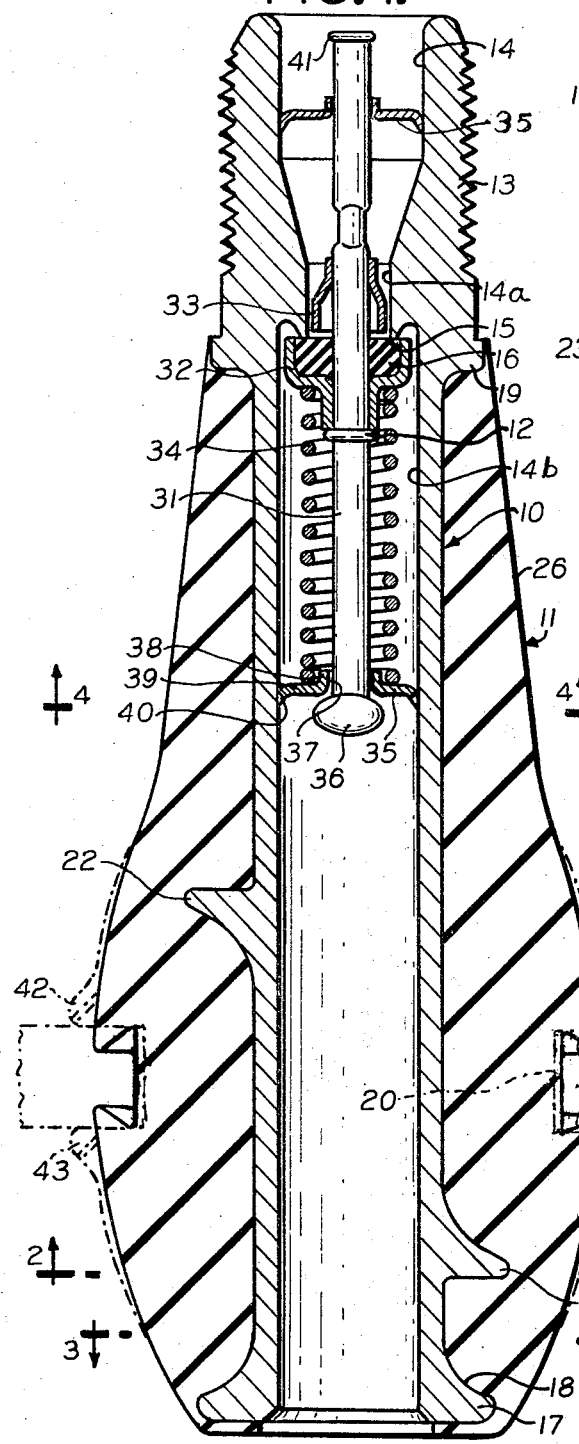

This invention relates to valves primarily adapted for use with tubeless tires, although useful with other supports, and aims to provide certain improvements in such valves.

Valves for tubeless tires are mounted directly onto the rims of vehicle wheels upon which the tires are mounted and are of three general types, viz: (1) those which are clamped onto the rim; (2) those which are pushed in through the valve stem opening in the rim from the inner face of the rim, and (3) those which are snapped into the valve stem opening in the rim from the exterior or tire supporting face of the rim. Of these three types, the snap-in tubeless tire valve is the one in most common use at the present time.

Both the push-in and the snap-in types of valves consist of a rigid tubular insert onto which a rubber-like covering, body or housing is bonded or cured by vulcanization, either partially or throughout the contiguous surfaces of the insert and the rubber covering. However, in the curing of the rubber covering onto the insert, poor adhesion occasionally takes place resulting in defective valve stems which must be rejected. The cost of such defective valve stems must be considered in pricing the valves and this addendum has been a problem of considerable magnitude with the tire manufacturers, many of whom in recent years because of their "know-how" in rubber technology have preferred to apply the rubber to a substantial portion of their valve stem requirements, the inserts for which they buy from the tire valve manufacturers.

Accordingly, an object of the present invention is to provide a tire valve stem, primarily adapted for use with tubeless tires, comprising an insert and a rubber covering therefor which does not require adhesion of the covering to the insert.

A further object of the invention is to provide a rubber covered valve stem in which the covering is molded over the insert in unbonded relation thereto and the fluid-tight seal required between the covering and the insert is augmented by subjecting the rubber material around the insert in the area where the valve stem passes through the valve stem opening in the rim to compressive force when the valve stem is mounted on a tire rim.

A still further object of the invention is to provide a rubber covered valve stem intended primarily to be mounted on a rim for supporting a tubeless tire by being pushed through the rim opening from the inner face of the rim and hence having the ability to be installed without demounting the tire from the rim or by being snapped into the valve stem opening from the exterior face of the rim.

A still further object of the invention is to provide a high reliability valve stem of the type set forth which has a non-removable valve core or valve insides which is factory set, factory tested and factory installed and thereby eliminates malfunctioning caused by improper field seating of valve core.

A still further object of the invention is to provide a significant cost reduction in rubber covered valve stems by not only eliminating the cost of defective rejects but also by virtue of a simplified construction of such valve stem which will render it more economical to replace a valve than to repair it.

The foregoing and other objects of the invention, not specifically enumerated, I accomplish by providing a valve stem for mounting in an opening in a tubeless tire wheel rim or other support comprising a rigid tubular insert and a tubular covering of rubber-like material coaxially encompassing said insert and held in unbonded relation thereto, said insert having integral external means thereon engaging within said covering to prevent relative rotation between said insert and covering while permitting flow of the covering material under stress between said means which is of smaller diametrical dimension than the opening in the support and disposed in axially spaced relation to the plane of the opening in the support when the valve stem is mounted in such support, said covering on at least one end being of smaller external diameter than the opening in the support and tapering outwardly from said end to a portion of larger diameter than said opening intermediate its ends at the region where the covering is intended to engage in said opening when said valve stem is mounted therein and said tapered portion of the covering enclosing said external means on the insert.

The invention will be readily understood from the detailed description which follows when considered in connection with the accompanying drawing which illustrates a preferred embodiment of the invention and wherein:

FIG. 1 is a diametrical sectional view of a valve stem embodying my invention shown as mounted on a rim illustrated in phantom.

Figure 2:
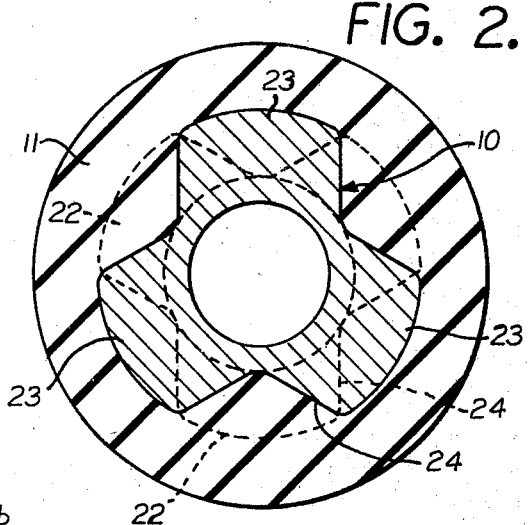
Figure 3:
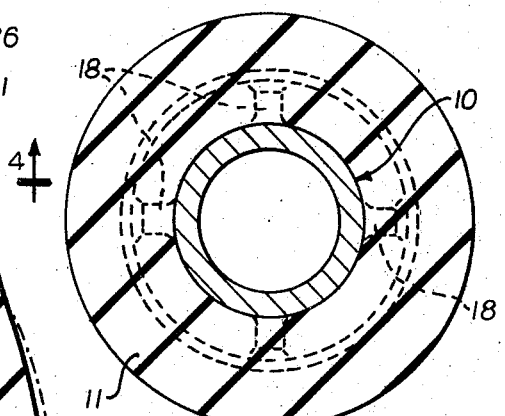
Figure 4:
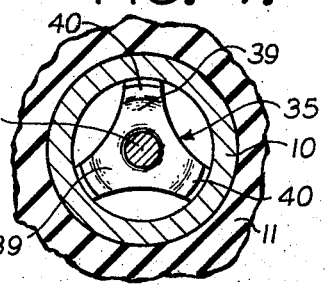

FIGS. 2, 3 and 4 are transverse sections taken along the planes of the lines 2—2, 3—3 and 4—4 respectively of FIG. 1.

Referring to the drawing the valve stem comprises a rigid tubular insert 10 having a covering 11 of rubber-like material coaxially encompassing said insert and held thereon in unbonded relation thereto and a valve insides 12 mounted within the insert.

The tubular insert 10 may be formed of machined metal or as a die casting or of a suitable molded plastic such as polyphenolene oxide or nylon and fiberglass and as is conventional, has an externally threaded nipple portion 13, an internal bore having portions 14, 14a and 14b adapted to accommodate the valve insides or core 12 and an internally directed valve seat 15 for cooperation with a washer 16 of the valve core. The insert at its inner end has an outwardly projecting peripheral flange or abutment 17 which is reinforced by ribs 18 and adjacent its outer end, inwardly of the nipple 13, with a flange or abutment 19, each of said flanges being of smaller diameter than the diameter of a standard size opening 20 in a wheel rim 21 upon which the valve stem is to be mounted. Between the flanges 17 and 19 the insert is formed with external means, herein shown as two flanges 22 and 23 which engage within the covering 11 to prevent relative rotation between said insert and the covering. The flanges 22 and 23 are also of smaller diameter than the opening 20 in rim 21 and are disposed in opposed axial space relation to the mid-plane of the opening in the rim when the valve stem is mounted in such rim. Each of the flanges 22 and 23 is formed with circumferentially spaced peripheral recesses 24 within which the covering material engages and the recesses on the respective flanges are preferably staggered in relation to one another so that the recesses in one flange will overlie the unrecessed portions of the other flange. The recesses 24 in the flanges 22 and 23 are for the further purpose of permitting flow of the covering material under stress when the valve stem is being mounted in the opening 20 of rim 21 as will be explained hereinafter.

The rubber-like covering 11 has an annular thickened portion 25 provided by exterior wall surfaces 26 and 27 which taper outwardly from the flanges 17 and 19 respectively toward a thickened portion 25 whereat the covering is formed with an exterior peripheral groove 28. The groove 28 has side walls 29 and 30 which are undercut and a base wall 31 which has an external diameter larger than the valve stem opening 20 in the rim 21 upon which the valve stem is to be mounted and an axial dimension substantially equal to the thickness of said rim. The covering 11 is preferably molded over the exterior surface of the insert 10 between the flanges 17 and 19 to remain in unbonded relation thereto and where necessary the outer surface of the insert may be pre-coated with a suitable substance which will prevent such bonding. The flanges 17 and 19 act as abutments for the end portions of the rubber covering and cause accumulation and back-up supports for said rubber and resist passage of the valve stem through the rim opening during mounting and removal of the valve stem. Where the covering engages over the bottom of flange 17, it will act as a flap valve and act as a secondary seal by sealing against said flange under internal tire pressure and serve to prevent leakage of air between the covering and the insert at the inner end of the valve stem.

The valve insides or core 12 is of modified conventional construction and consists of a valve pin 31 upon which is fixedly mounted a plunger cup 32 within which the valve washer 16 is held by a ferrule 33, a spring 34 and a spring support 35. The inner end of the valve pin is formed with an enlargement 36 to hold the parts in assembled relation.

The spring support 35 as herein shown is a lock spring and consists of a hard resilient metal body portion having a central opening 37 from which extends an axial tubular projection 38 through which the valve pin is movable and with a plurality of arms 39 the free ends 40 of which are angularly bent outwardly from the plane of the body and adapted when moved inwardly under stress and released, to exert outward force sufficient to bite into softer metal or molded plastic of which the insert 10 is made to hold the lock spring in such engagement. The valve core parts may be assembled by machine and the completed valve core may be factory set into the bore portion 14b of the insert and held therein by the lock spring 35 and factory tested for leak-proofness of the valve. If desired, a second lock spring 35 may be mounted within the insert bore portion 14 over the outer end of the valve pin to better guide the valve core in its operation. Also, if desired, the outer end of the valve pin may be peened or enlarged as shown at 41 for better cooperation with a deflating pin of a pressure gauge or inflating chuck.

The valve stem hereinbefore described and illustrated in the drawing may be said to possess numerous advantages over conventional snap-in and push-in types of valve stems, viz:

(a) The valve stem may be mounted on a tire by being forced through the rim opening from either face of the rim in the course of which action the recesses 24 in the flanges 22 and 23 will permit the deformation and flow of the rubber-like material until either wall 29 or 30 of the groove 28 has passed through the opening 20 in the rim whereupon the deformed rubber-like material due to its inherent elasticity will readjust itself and assume substantially the form shown at 42 and 43 in FIG. 1 wherein the covering contiguous to the rim at said opening will be partially in compressive stress and partially in tension and function to provide fluid tight seals between the covering and the rim and between the covering and the insert under all operating conditions of a vehicle upon the wheel rim of which such valve stem is mounted;

(b) The valve stem may be installed without demounting a tire or removing the wheel upon which such tire is mounted from a vehicle;

(c) The valve stem construction decreases installation time of the valve stem;

(d) The valve stem provides ease of tire bead seating and tire inflation as both may be accomplished simultaneously;

(e) The valve stem is interchangeable and useful as a replacement for currently standard snap-in valves;

(f) The non-removable valve core provides increased safety to a gas station attendant when inserting a new valve stem by eliminating tire blow caused by excessive inflation rate;

(g) The non-removable valve core provides increased reliability;

(h) The valve stem provides increased resistance to pull-out, and its removability from wheel rim results in positive destruction of the valve stem although the valve stem is removable in one piece.

From the foregoing description it will be appreciated that the present invention accomplishes the various objects set forth in the opening statements of this specification and although I have shown and described a preferred embodiment of my invention, it is to be understood that structural details thereof may be varied within the range of engineering and mechanical skill without departing from the spirit of the invention as hereinafter claimed.

What I claim is:

1. A valve stem for mounting on a support having an opening therein to accommodate such valve stem, comprising a rigid tubular insert and a tubular covering of rubber-like material molded in coaxially encompassing relation to said insert and held in unbonded relation thereon, said insert having thereon external projecting means providing circumferentially spaced recesses engaging within said covering for preventing relative rotation between said insert and covering while permitting flow of the covering material under stress between said means and being dimensioned to pass through the opening in the support and disposed in axially spaced relation to the plane of the opening in the support when the valve stem is mounted in such support, said covering on at least one end being of smaller external diameter than the opening in the support and tapering outwardly from said end to a portion of larger diameter than said opening at the region where the covering is intended to engage in said opening when said valve stem is mounted therein and said tapered portion of the covering enclosing said external means on the insert.

2. A valve stem according to claim 1, wherein the external means on the insert is a flange having circumferentially-spaced peripheral recesses.

3. A valve stem according to claim 1, wherein the insert at its inner end has a peripheral enlargement and the covering has an end flap overlying and in engagement with the bottom end face of said enlargement.

4. A valve stem, for mounting on a support having an opening therein to accommodate such valve stem, comprising a rigid tubular insert and a tubular covering of rubber-like material coaxially encompassing said insert and held in unbonded relation thereon, said insert having a pair of axially spaced outer flanges with peripheral recesses therein in which the covering material engages, said flanges being of smaller diameter than the opening in the support and being disposed one on either side of the plane of the opening in the support when the valve stem is mounted in such support; said covering at its opposite ends being of smaller external diameter than the opening in such support and having an annular portion intermediate its ends of larger diameter than the opening in the support at the region where the covering is intended to engage in said opening when mounted therein and being progressively larger in diameter from each said small end toward said region of larger diameter, said valve stem being adapted to be forced through the opening in the support from either end of the valve stem, in the course of such action the covering portion of larger external diameter in proximity to a flange on the insert will become deformed and, stressed and will flow through the recesses in a flange to permit the portion of larger diameter to engage in said opening to provide and maintain a fluid-tight seal between the covering and the rim of the opening and between the covering and the insert.

5. A valve stem according to claim 4, wherein the recesses in the flanges are so related that the recesses in one flange overlie the unrecessed portions on the other flange.

6. A valve stem according to claim 4, wherein the flanges on the insert are spaced approximately at equal axial distances from the transverse plane of the covering portion of larger diameter.

7. A valve stem according to claim 4, wherein the insert at its inner end has an outwardly projecting peripheral flange and the rubber covering encloses said flange.

8. A valve stem according to claim 4, wherein the insert at its outer end has an outwardly projecting peripheral abutment engaging the rubber covering.

9. A valve stem according to claim 4, wherein the insert at its inner end and adjacent its outer end has an outwardly projecting peripheral flange, said flanges providing abutments for the respective ends of the rubber covering.

References Cited

UNITED STATES PATENTS

| | | | |
|---|---|---|---|
| 2,822,817 | 2/1958 | Benzel | 137—223 |
| 2,874,750 | 2/1959 | Boyer | 152—427 |
| 3,032,091 | 5/1962 | McCord | 152—427 |

ARTHUR L. LA POINT, *Primary Examiner.*

C. B. LYON, *Assistant Examiner.*